United States Patent
Yasuda et al.

(10) Patent No.: US 7,403,367 B2
(45) Date of Patent: Jul. 22, 2008

(54) ACTIVE VIBRATION INSULATOR

(75) Inventors: Takayoshi Yasuda, Komaki (JP); Hideki Oshima, Komaki (JP); Hiroyuki Ichikawa, Kani (JP); Daichi Mizushima, Anjo (JP); Takehiko Fushimi, Kariya (JP); Kenichi Sato, Nagoya (JP)

(73) Assignees: Tokai Rubber Industries, Ltd, Komaki-shi (JP); Aisin Seiki Kabushiki Kaisha, Kariya-shi (JP)

( * ) Notice: Subject to any disclaimer, the term of this patent is extended or adjusted under 35 U.S.C. 154(b) by 395 days.

(21) Appl. No.: 11/317,049

(22) Filed: Dec. 27, 2005

(65) Prior Publication Data
US 2006/0139840 A1 Jun. 29, 2006

(30) Foreign Application Priority Data
Dec. 28, 2004 (JP) ............................. 2004-381311
Jun. 10, 2005 (JP) ............................. 2005-171178

(51) Int. Cl.
*H01H 47/00* (2006.01)
(52) U.S. Cl. ...................... 361/139; 361/143
(58) Field of Classification Search ............... 361/139, 361/143; 318/114, 128, 460; 700/42, 280
See application file for complete search history.

(56) References Cited

U.S. PATENT DOCUMENTS
5,939,625 A  8/1999  Torii et al.

FOREIGN PATENT DOCUMENTS

| DE | 196 20 844 A1 | 11/1996 |
|---|---|---|
| EP | 0 884 502 A2 | 12/1998 |
| EP | 1 455 112 A2 | 9/2004 |
| JP | 8-270723 | 10/1996 |
| JP | 10-196711 | 7/1998 |
| JP | 2000-18316 | 1/2000 |
| JP | 2000-20139 | 1/2000 |

OTHER PUBLICATIONS

U.S. Appl. No. 11/190,170, filed Jul. 27, 2005, Hiroyuki Ichikawa, et al.

*Primary Examiner*—Stephen W Jackson
*Assistant Examiner*—Danny Nguyen
(74) *Attorney, Agent, or Firm*—Oblon, Spivak, McClelland, Maier & Neustadt, P.C.

(57) ABSTRACT

An active vibration insulator includes an electromagnetic actuator, a control-signals generating device, a driver, a calculator, and a judging device. The electromagnetic actuator generates vibrating forces depending on electric-current supplies. The control-signals generating device generates cyclic control signals based on cyclic pulsating signals output from a vibration generating source of a vehicle. The cyclic control signals actively inhibit vibrations generated by the vibration generating source from transmitting to a specific part of the vehicle. The driver drives the electromagnetic actuator by making the electric-current supplies variable based on the cyclic control signals. The calculator calculates an estimated transfer function composed of estimated values of a transfer function for a transfer system including the electromagnetic actuator and the driver. The judging device judges an inoperative malfunction of the electromagnetic actuator based the estimated transfer function.

12 Claims, 8 Drawing Sheets

ACTIVE VIBRATION INSULATOR

BACKGROUND OF THE INVENTION

1. Field of the Invention

The present invention relates to an active vibration insulator, especially, an active vibration insulator for actively inhibiting the vibrations of vibration generating sources, such as vehicle engines, from transmitting.

2. Description of the Related Art

Conventionally, an active vibration insulator has been equipped with an electromagnetic actuator for generating active vibrating forces, such as solenoid, for example. When the electromagnetic actuator is under an inoperative malfunction because of plunger lock or broken wire, for instance, there arises a problem, such as the flow of over current in the electromagnetic actuator.

Hence, Japanese Unexamined Patent Publication (KOKAI) No. 8-270,723, for example, discloses to detect the malfunction of the electromagnetic actuator. According to the patent publication, the electromagnetic actuator is judged to be under a malfunction when the maximum value of residual vibrations, which are detected by an acceleration sensor, exceeds a threshold value, and when the intervals of the maximum-value generation show the same cyclicity as those of the vibrating signals of an engine.

However, in the malfunction judgement set forth in Japanese Unexamined Patent Publication (KOKAI) No. 8-270,723, it is extremely difficult to determine the threshold value, which are compared with the maximum value of residual vibrations. This results from the fact that the residual vibrations, which are detected by an acceleration sensor, include various vibration components other than the vibration components resulting from an engine. That is, when the threshold value is low, no malfunction judgment can be made because the maximum value, which does not show the same cyclicity as those of the vibration signals of an engine, has been detected. On the contrary, when the threshold value is high, no reliable malfunction judgment can be made because the maximum value, which shows the same cyclicity as those of the vibration signals of an engine, might not be extracted. On the other hand, it is possible to extract specific-range frequency components from the residual vibrations by a band-pass filter, for instance, in order to carry out the malfunction judgement based on the extracted signal components. However, using a band-pass filter has resulted in highly increasing the manufacturing cost.

SUMMARY OF THE INVENTION

The present invention has been developed in view of the aforementioned circumstance. It is therefore an object of the present invention to provide an active vibration insulator which can securely detect an inoperative malfunction of electromagnetic actuators, while intending to reduce the manufacturing cost.

Hence, the inventors of the present invention had studied to solve the aforementioned problem wholeheartedly, and had thought of judging an inoperative malfunction of electromagnetic actuators, using a transfer function. Thus, they arrived at completing the present invention.

Specifically, an active vibration insulator according to the present invention comprises:

an electromagnetic actuator for generating vibrating forces depending on electric-current supplies;

a control-signals generator for generating cyclic control signals based on cyclic pulsating signals output from a vibration generating source of a vehicle, the cyclic control signals actively inhibiting vibrations generated by the vibration generating source from transmitting to a specific part of the vehicle;

a driver for driving the electromagnetic actuator by making the electric-current supplies variable based on the cyclic control signals;

a calculator for calculating an estimated transfer function composed of estimated values of a transfer function for a transfer system including the electromagnetic actuator and the driver; and a judge for judging an inoperative malfunction of the electromagnetic actuator based the estimated transfer function.

Here, the "transfer function for the transfer system" refers to a transfer function for a system beginning with the driver and arriving at a specific part, to which the electromagnetic actuator tries to inhibit the vibrations generated by the vibration generating source from transmitting. For example, when the specific part, to which the electromagnetic actuator tries to inhibit the vibrations from transmitting, is an engine frame, to which the electromagnetic actuator is fastened, the transfer function refers to a transfer function for a system beginning with the driver and arriving at the engine frame.

Moreover, the "inoperative malfunction of the electromagnetic actuator" refers to malfunctions, which make the electromagnetic actuator inoperative, such as the instances that the wiring connected to the electromagnetic actuator has been broken; the plunger of the electromagnetic actuator has been locked; and a vibratable plate for supporting the plunger of the electromagnetic actuator has been ruptured, for instance.

The present active vibration insulator judges the inoperative malfunction of the electromagnetic actuator, using the estimated transfer function. Here, when the electromagnetic actuator can operate normally, if the estimated transfer function is calculated a plurality of times, the resulting estimated transfer functions coincide with each other, or differ only slightly to each other. On the other hand, the estimated transfer function, which is calculated when the electromagnetic actuator is under the inoperative malfunction, differs greatly from the estimated transfer function, which is calculated when the electromagnetic actuator is in the normal condition. Therefore, it is possible to judge that the electromagnetic actuator is under the inoperative malfunction when the estimated transfer function differs greatly from the estimated transfer functions in the normal condition. That is, the present active vibration insulator can detect the inoperative malfunction of the electromagnetic actuator with ease and securely. Moreover, it is possible to reduce the manufacturing cost of the present active vibration insulator, because the present active vibration can detect the inoperative malfunction of the electromagnetic actuator without using a band-pass filter additionally.

It is advisable that the present active vibration insulator can further comprise first-datum-value storage for storing a datum gain threshold value for gain components of the estimated transfer function in advance, wherein:

the judge judges that the electromagnetic actuator is under the inoperative malfunction when the gain components of the estimated transfer function are smaller than the datum gain threshold value.

Here, when the electromagnetic actuator can operate normally, if the gain components of the estimated transfer function are calculated a plurality of times, all of the resulting gain components are relatively large values which coincide with each other, or the resultant gain components differ only slightly to each other approximately. On the other hand, the gain components, which are calculated when the electromagnetic actuator is under the inoperative malfunction, become remarkably smaller values than those which are calculated when the electromagnetic actuator is in the normal condition. Therefore, it is possible to judge that the electromagnetic actuator is under the inoperative malfunction when the gain components of the estimated transfer function become a remarkably small value, specifically, when the gain components of the estimated transfer function are smaller than the datum gain threshold value.

Note that the gain components of the estimated transfer function change only slightly, though they might change as the driver and electromagnetic actuator change with time. That is, it is very easy to set up the datum gain threshold value, even when taking the changes of the driver and electromagnetic actuator with time into consideration. Therefore, even when the driver and electromagnetic actuator change with time, it is possible to securely judge the inoperative malfunction of the electromagnetic actuator. Moreover, it is advisable to variably set up the datum gain threshold value based on the normal gain components when the driver and electromagnetic actuator change with time. In such an instance as well, it is possible to securely judge the inoperative malfunction of the electromagnetic actuator.

Moreover, it is advisable that the present active vibration insulator can further comprise second-datum-value storage for storing a datum phase range for phase components of the estimated transfer function in advance, wherein:

the judge judges that the electromagnetic actuator is under the inoperative malfunction when the phase components of the estimated transfer function fall outside the datum phase range.

Here, when the electromagnetic actuator can operate normally, if the phase components of the estimated transfer function are calculated a plurality of times, the resulting phase components fall only in a relatively small phase range, which is based on a predetermined value, approximately. On the other hand, the phase components, which are calculated when the electromagnetic actuator is under the inoperative malfunction, are often displaced greatly with respect to those which are calculated when the electromagnetic actuator is in the normal condition. Therefore, it is possible to judge that the electromagnetic actuator is under the inoperative malfunction when the phase components of the estimated transfer function fall outside the datum phase range. Note that it is easy to set up the datum phase range in the substantially same manner as the gain components, even when taking the changes of the driver and electromagnetic actuator with time into consideration. Moreover, it is advisable to variably set up the datum phase range based on the normal phase components when the driver or the electromagnetic actuator changes with time.

Note that, when carrying out the malfunction judgement based on the gain components of the estimated transfer function as described above, it is possible to more securely detect the inoperative malfunction of the electromagnetic actuator by further carrying out the malfunction judgement based on the phase components. Specifically, the electromagnetic actuator is judged to be under the inoperative malfunction when the judgement based on the phase components is abnormal, even if the judgement based on the gain components are normal.

Moreover, it is advisable that the present active vibration insulator can be adapted so that the control-signals generator generates cyclic inspection signals composed of cyclic signals whose frequency is from 0 to 30 Hz, and outputs the cyclic inspection signals to the driver; and the active vibration insulator further comprising a detector for detecting driving waveforms of the electromagnetic actuator driven by the driver based on the cyclic inspection signals, wherein:

the calculator calculates the estimated transfer function based on the cyclic inspection signals and the driving waveforms.

Here, the frequencies of from 0 to 30 Hz are around the lower limit of the audible frequency spectrum for human beings, or fall outside the audible frequency spectrum. That is, when the electromagnetic actuator is driven based on the cyclic inspection signals composed of cyclic signals whose frequency is from 0 to 30 Hz, it is possible to make the driving sounds of the electromagnetic actuator inaudible to vehicle passengers. Note that the frequency of the cyclic inspection signals can preferably fall in a range of from 0 to 25 Hz, further preferably from 0 to 20 Hz. Thus, it is possible to more securely make the driving sounds of the electromagnetic actuator inaudible to vehicle passengers.

It is advisable that the cyclic inspection signals can be composed of inspection signals whose amplitude is a predetermined amplitude or less, amplitude which makes an amplitude of the cyclic inspection signals. The "predetermined amplitude" refers to such amplitudes that vehicle passengers cannot physically sense the vibrations resulting from the electromagnetic actuator when the electromagnetic actuator is driven based on the cyclic inspection signals which exhibit the predetermined amplitude. The predetermined amplitude can preferably be such amplitudes that are equivalent to the vibrating forces, which the electromagnetic actuator generates, whose magnitude is 15 Nrms or less, further preferably 10 Nrms or less, furthermore preferably 5 Nrms or less.

Here, note that the larger the inspection-signal amplitudes are the larger the amplitudes of the electromagnetic actuator are. Accordingly, the possibility that vehicle passengers physically sense the vibrations resulting from the electromagnetic actuator is high. In certain cases, it might be highly likely that the driving sounds of the electromagnetic actuator are audible to vehicle passengers. Consequently, when the inspection-signal amplitudes are made equal to or less than the predetermined amplitude, it is not only possible to make the vibrations, which the electromagnetic actuator generates, insensible to vehicle passenger, but also to make the driving sounds of the electromagnetic actuator inaudible to vehicle passenger. However, the inspection-signal amplitudes can be such amplitudes that the detector can detect the driving waveforms and at the same time the calculator can calculate the estimated transfer function.

Further, it is advisable that the cyclic inspection signals can last for inspection-signal times which fall within a period of time. The "predetermined period of time" refers to such time periods that vehicle passengers cannot physically sense the vibrations resulting from the electromagnetic actuator when the electromagnetic actuator is driven based on the cyclic inspection signals which last for the predetermined period of time. The predetermined period of time can preferably be such time periods that last for within 1.0 sec., further preferably within 0.8 sec., furthermore preferably within 0.4 sec.

Here, note that the longer the inspection-signal time is for the longer period of time the electromagnetic actuator vibrates. Accordingly, the possibility that vehicle passengers physically sense the vibrations resulting from the electromagnetic actuator is high. In certain cases, it might be highly likely that the driving sounds of the electromagnetic actuator are audible to vehicle passengers. Consequently, when the inspection-signal time falls within a predetermined period of time, it is not only possible to make the vibrations, which the electromagnetic actuator generates, insensible to vehicle passenger physically, but also to make the driving sounds of the electromagnetic actuator inaudible to vehicle passenger. However, the inspection-signal time can be such time periods that the detector can detect the driving waveforms and at the same time the calculator can calculate the estimated transfer function.

Note that it is possible to more securely produce the aforementioned advantages when the cyclic inspection signals exhibit a predetermined amplitude or less and when the inspection-signal time falls within a predetermined time period, in addition to the arrangement that the cyclic inspection signals exhibit a frequency of from 0 to 30 Hz.

Also note that the "driving waveforms of the electromagnetic actuator" comprise the waveforms of vibrations, which the electromagnetic actuator generates, vibrating forces (or loads), which the electromagnetic actuator generates, and electric currents which are supplied to the electromagnetic actuator. When the driving waveforms comprise the waveforms of vibrations, which the electromagnetic actuator generates, it is advisable that the detector can comprise a vibration-detection sensor, such as an acceleration sensor, which can detect the vibrations. Moreover, when the driving waveforms comprise the waveforms of vibrating forces (or loads), which the electromagnetic actuator generates, it is advisable that the detector can comprise a load sensor, which can detect the vibrating forces. In addition, when the driving waveforms comprise the waveforms of electric currents, which are supplied to the electromagnetic actuator, it is advisable that detector can comprise an electric-current sensor, which can detect the electric currents. Note that the electric current, which are supplied to the electromagnetic actuator, are substantially identical with the electric currents which the driver outputs to the electromagnetic actuator.

Moreover, when judging the inoperative malfunction of the electromagnetic actuator by the gain components, it is advisable that the present active vibration insulator can be modified so that the first-datum-value storage stores a plurality of the gain threshold values which differ depending on vehicle conditions; and the judge judges that the electromagnetic actuator is under the inoperative malfunction when the gain components of the estimated transfer function are smaller than the datum gain threshold values, which correspond to the vehicle conditions when the calculator calculates the estimated transfer function.

Note that the gain components of the estimated transfer function might differ depending on vehicle conditions. Hence, when the inoperative malfunction of the electromagnetic actuator is judged based on the datum gain threshold values, which depend on vehicle conditions, it is possible to furthermore improve the accuracy of judging the inoperative malfunction.

Moreover, when judging the inoperative malfunction of the electromagnetic actuator by the phase components, it is advisable that the present active vibration insulator can be modified so that the second-datum-value storage stores a plurality of the datum phase ranges which differ depending on vehicle conditions; and the judge judges that the electromagnetic actuator is under the inoperative malfunction when the phase components of the estimated transfer function fall outside the datum phase ranges, which correspond to the vehicle conditions when the calculator calculates the estimated transfer function.

Note that the phase components of the estimated transfer function might differ depending on vehicle conditions.

Hence, when the inoperative malfunction of the electromagnetic actuator is judged based on the datum phase ranges, which depend on vehicle conditions, it is possible to furthermore improve the accuracy of judging the inoperative malfunction.

Note that the "driving conditions" refer to the conditions when an ignition switch is turned on, and the conditions when the vehicle is under idling. That is, the datum gain threshold values and datum phase ranges are made different, depending on the conditions when an ignition switch is turned on and the conditions when the vehicle is under idling, for example. Also note that the "conditions when an ignition switch is turned on" refer to the conditions when an ignition switch is turned on for starting an engine for the first time, if the vehicle is driven by an engine only, for instance. That is, the "conditions when an ignition switch is turned on" correspond to the so-called initial checking time.

Moreover, it is advisable that the inspection-signal amplitude and inspection-signal time of the cyclic inspection signals can be made different, depending on vehicle conditions. Here, depending on vehicle conditions, the inspection-signal amplitude and inspection-signal time, under which vehicle passengers physically sense the vibrations generated by electromagnetic actuator, might differ. Besides, the larger the inspection-signal amplitude is, the more likely it is to carry out the judgement of the inoperative malfunction of the electromagnetic actuator. On the other hand, however, it becomes highly likely that vehicle passengers sense the vibrations physically. In addition, the longer the inspection-signal time is, the more likely it is to carry out the judgement whether the electromagnetic actuator is under the inoperative malfunction. On the other hand, however, it becomes highly likely that vehicle passengers sense the vibrations physically. Hence, by setting up the inspection-signal amplitude and inspection-signal time more adequately depending on vehicle conditions, it is possible to make the judgement of the inoperative malfunction of the electromagnetic actuator more readily to carry out, without letting vehicle passengers sense the vibrations physically.

Moreover, it is advisable that the present active vibration insulator can be modified so that the calculator calculates the estimated transfer function after an ignition switch of the vehicle is turned on in order to carry out the judgment of the inoperative malfunction of the electromagnetic actuator. In this instance, it is possible to carry out the judgement whether the electromagnetic actuator of the present active vibration insulator is under the inoperative malfunction, after shipping a vehicle, which is equipped with the present active vibration insulator, as a product.

For example, it is advisable that the present active vibration insulator can be modified so that the calculator calculates the estimated transfer function when an ignition switch of the vehicle is turned on (that is, immediately after an ignition switch of the vehicle is turned on). It is possible to calculate the estimated transfer function with much higher accuracy, because vibrations other the vibrations resulting from the electromagnetic actuator affect the calculation of the estimated transfer function less at the time when an ignition switch of the vehicle is turned on. As a result, it is possible to improve the accuracy of judging the inoperative malfunction of the electromagnetic actuator.

Moreover, it is advisable that the present active vibration insulator can be modified so that the calculator calculates the estimated transfer function when the vehicle is under idling. It is possible to calculate the estimated transfer function with much higher accuracy, because vibrations other the vibrations resulting from the electromagnetic actuator affect the calculation of the estimated transfer function less when the vehicle is under idling. As a result, it is possible to improve the accuracy of judging the inoperative malfunction of the electromagnetic actuator. Note that the "vehicle is under idling" refer to the instances that an engine is driven but a speed of the vehicle is smaller than a predetermined value. In particular, when an engine is driven but an actual speed of the vehicle is zero, the vehicle is not running. Accordingly, vibrations other the vibrations resulting from the electromagnetic actuator affect the calculation of the estimated transfer function much less. Consequently, it is possible to calculate the estimated transfer function with much higher accuracy. Note that output signals, which sensors for detecting vehicle speeds output, involve noises. Accordingly, it is advisable to carry out the judgement whether a speed of the vehicle is zero when the output signals are a predetermined value or less. In addition, it is advisable to define the "vehicle is under idling" as the instances that an engine is driven, but a speed of the vehicle is smaller than a predetermined value, and additionally a shift position of an automatic transmission for the vehicle is placed at the "N (neutral)" range or "P (parking)" range. In particular, when a shift position is placed at the "N (neutral)" range or "P (parking)" range, less loads are applied to an engine of the vehicle. Consequently, an engine of the vehicle vibrates less. That is, vibrations other the vibrations resulting from the electromagnetic actuator affect the calculation of the estimated transfer function much more less. Accordingly, it is possible to calculate the estimated transfer function with much higher accuracy.

Note that it is advisable to modify the calculator so as to calculate the estimated transfer function only when the vehicle is under idling for the first time after an ignition switch of the vehicle is turned on, or so as to calculate the estimated transfer function for every time the vehicle is put in idling.

In addition, it is advisable that the present active vibration insulator can be modified so that the calculator calculates the estimated transfer function after a predetermined time has passed since an ignition switch of the vehicle is turned on and when the vehicle is under idling. Here, note that it takes a predetermined period of time to completely pre-charge a capacitor, which is included in the driver, since an ignition switch of the vehicle is turned on. Moreover, it takes a predetermined period of time for the detector, such as an acceleration sensor, to stabilize since an ignition switch of the vehicle is turned on. Hence, a capacitor, which is included in the driver, is pre-charged completely, and the detector, such as an acceleration sensor, is stabilized, after a predetermined time has passed since an ignition switch of the vehicle is turned on. That is, it is possible to calculate the estimated transfer function with much higher accuracy by calculating the estimated transfer function after a predetermined time has passed since an ignition switch of the vehicle is turned on and when the vehicle is under idling. As a result, it is possible to furthermore improve the accuracy of judging the inoperative malfunction of the electromagnetic actuator.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present invention will be hereinafter described in more detail while naming its specific embodiments.

Figure 1:
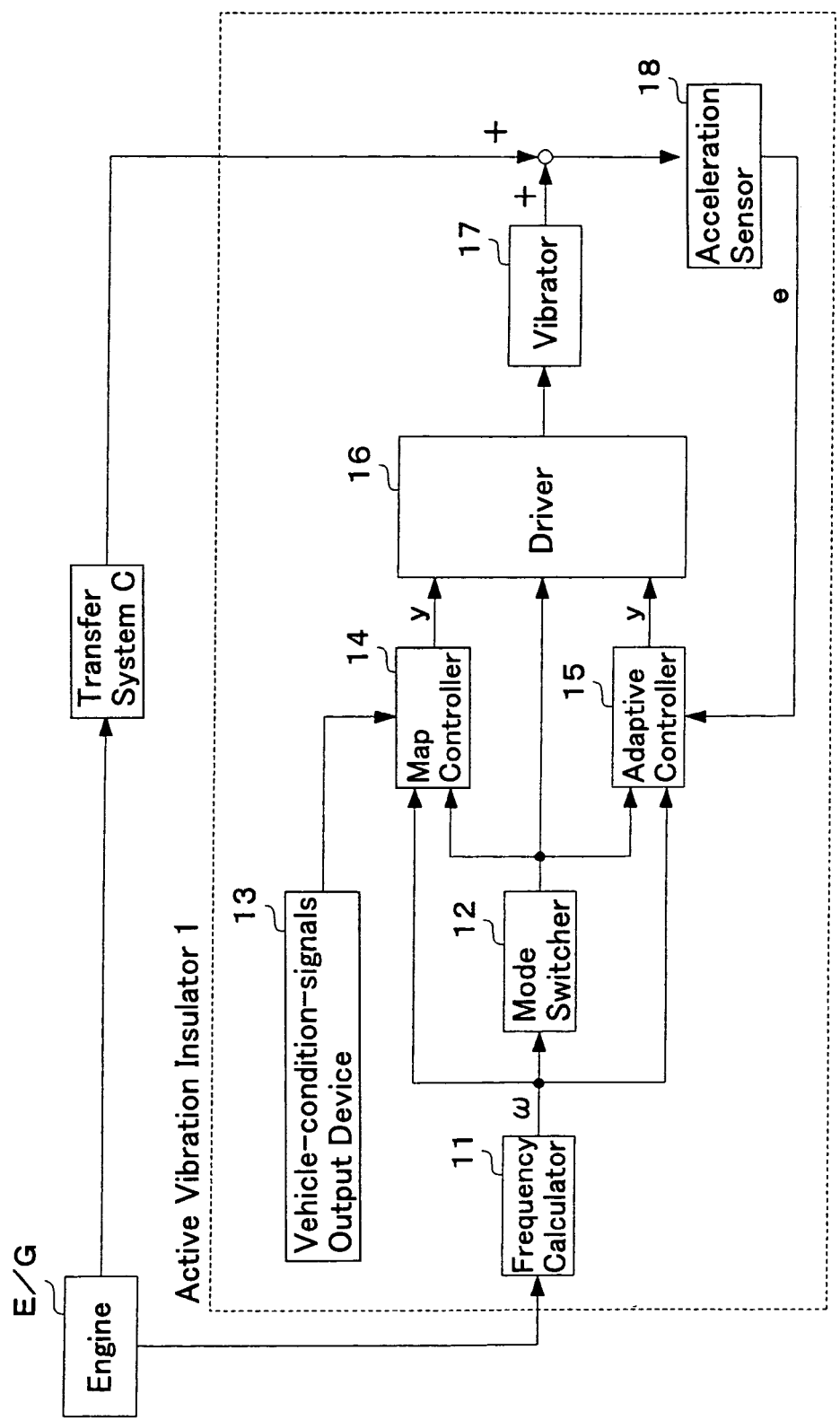
FIG. 1 is a block diagram for illustrating an arrangement of an active vibration insulator 1 according to an example of the present invention, arrangement from which part of a malfunction-detection processor 19, one of the constituent elements of the active vibration insulator 1, is excluded.

(1) Arrangement of Active Vibration Controller 1, Arrangement from which Part of Malfunction-detection Processor 19 is Excluded An arrangement of an active vibration insulator 1 according to an example of the present invention will be hereinafter described with reference to FIG. 1. Note that part of a malfunction-detection processor 19, one of the constituent elements of the active vibration insulator 1, is not shown in FIG. 1. The malfunction-detection processor 19 will be described later. FIG. 1 is a block diagram for illustrating an arrangement of the active vibration insulator 1, arrangement from which the malfunction-detection processor 19 is excluded. The active vibration insulator 1 is an apparatus for actively inhibiting vibrations, which an engine E/G (i.e., vibration generating source) carried on a vehicle generates, from transmitting to the vehicle's respective parts. Note that the active vibration insulator 1 can be activated by turning on an ignition switch of the vehicle. As illustrated in FIG. 1, the active vibration insulator 1 comprises a frequency calculator 11, a mode switcher 12, a vehicle-condition-signals output device 13, a map controller 14, an adaptive controller 15, a driver 16, a vibrator 17, and an acceleration sensor (i.e., G sensor) 18.

The frequency calculator 11 receives cyclic pulsating signals, which are output from a rotary detector (not shown) for detecting the revolutions of the engine E/G. Then, the frequency calculator 11 calculates the angular frequencies ω of the cyclic pulsating signals based on the input cyclic pulsating signals.

The mode switcher 12 receives the angular frequencies ω of the cyclic pulsating signals which the frequency calculator 11 calculates. Then, the mode switcher 12 judges switching from a map control mode to an adaptive control mode, or vice versa, based on the input angular frequencies ω of the cyclic pulsating signals. The mode switcher 12 selects one or the other of map control mode and adaptive control mode.

The vehicle-condition-signals output device 13 is used during the map control mode. The vehicle-condition-signals output device 13 outputs signals on vehicle conditions, for example, such as driven states of the engine, vehicle speeds, shift positions of a transmission (e.g., forward "D" range, neutral "N" range, reverse "R" range, parking "P" range) and turned-on or off air-conditioner switch, to the map controller 14.

The map controller 14 (i.e., control-signals generator) operates when the mode switcher 12 switches the adaptive control mode to the map control mode. That is, when the adaptive control mode is switched to the map control mode by the mode switcher 12, the map controller 14 receives the angular frequencies ω of the cyclic pulsating signals, which the frequency calculator 11 calculates, and the vehicle-condition signals, which the vehicle-condition-signals output device 13 outputs. Then, the map controller 14 calculates cyclic control signals y based on the input angular frequencies ω of the cyclic pulsating signals and the input vehicle-condition signals as well as stored map data. The cyclic control signals y are signals for enabling the active vibration insulator 1 to actively inhibit the vibrations, which the engine E/G generates at the installation location of the accelerator sensor 18, from transmitting to the vehicle's specific parts.

The adaptive controller 15 (i.e., control-signals generator) operates when the mode switcher 12 switches the map control mode to the adaptive control mode. That is, when the map control mode is switched to the adaptive control mode by the mode switcher 12, the adaptive controller 15 receives the angular frequencies ω of the cyclic pulsating signals, which the frequency calculator 11 calculates, and error signals e, which the later-described acceleration sensor 18 detects. Then, the adaptive controller 15 calculates cyclic control signals y by means of an adaptive control method, based on the input frequencies ω of the cyclic pulsating signals and the input error signals e. The cyclic control signals y are signals for enabling the active vibration insulator 1 to actively inhibit the vibrations, which the engine E/G generates at the installation location of the accelerator sensor 18, from transmitting to the vehicle's specific parts.

The driver 16 (i.e., driver) actuates the later-described vibrator 17 based on the cyclic control signals y which the map controller 14 or the adaptive controller 15 outputs. Specifically, the driver 16 comprises a PWM (i.e., pulse-width modulation) converter, and a switching circuit. The PWM converter converts the input cyclic control signals y into PWM signals. The switching circuit is made up of a plurality of switching devices, which are driven based on the PWM signals to supply electric currents to the vibrator 17. That is, the switching circuit making the driver 16 supplies such electric currents to the vibrator 17 that actively inhibit the vibrations, which the engine E/G generates at the installation location of the accelerator sensor 18, from transmitting to the vehicle's specific parts.

Here, the driver 16 receives the control mode which the mode switcher 12 selects. That is, when the mode switcher 12 switches the adaptive control mode to the map control mode, the driver 16 actuates the vibrator 17 based on the cyclic control signals y which the map controller 14 outputs. On the other hand, when the mode switcher 12 switches the map control mode to the adaptive control mode, the driver 16 actuates the vibrator 17 based on the cyclic control signals y which the adaptive controller 15 outputs.

The vibrator (electromagnetic actuator) 17 comprises a solenoid which is installed to an engine mount 20, which will be described later, for example. The solenoid, the vibrator 17, generates vibrating forces, depending on electric-current supplies to its coil. That is, controlling the electric-current supply to the coil of the solenoid, the vibrator 17, can vary the vibrating forces. Here, the driver 16 controls the electric-current supply to the coil so as to actively inhibit the vibrations, which the engine E/G generates at the installation location of the accelerator sensor 18, from transmitting to the vehicle's specific parts. That is, the vibrating forces produced by the vibrator 17 actively inhibit the vibrations, which the engine E/G generates at the installation location of the accelerator sensor 18, from transmitting to the vehicle's specific parts. For instance, when the vibrations of the engine E/G and the vibrations generated by the vibrator 17 cancel with each other, the vibrations of the engine E/G are not transmitted to the vehicle-body side.

The acceleration sensor 18 (i.e., detector) is installed to a fixing part, one of the parts of the later-described engine mount 20, at which the engine mount 20 is fixed to an engine frame. That is, the acceleration sensor 18 detects vibrations at the fixing part, one of the parts of the engine mount 20. Specifically, the acceleration sensor 18 detects vibrations (hereinafter referred to as "error signals") e which are produced by synthesizing the vibrations of the engine E/G transmitted by way of a transfer system C and the vibrations generated by the vibrator 17. The acceleration sensor 18 outputs the error signals e to the adaptive controller 15.

(2) Detailed Arrangement of Adaptive Controller 15

Figure 2:
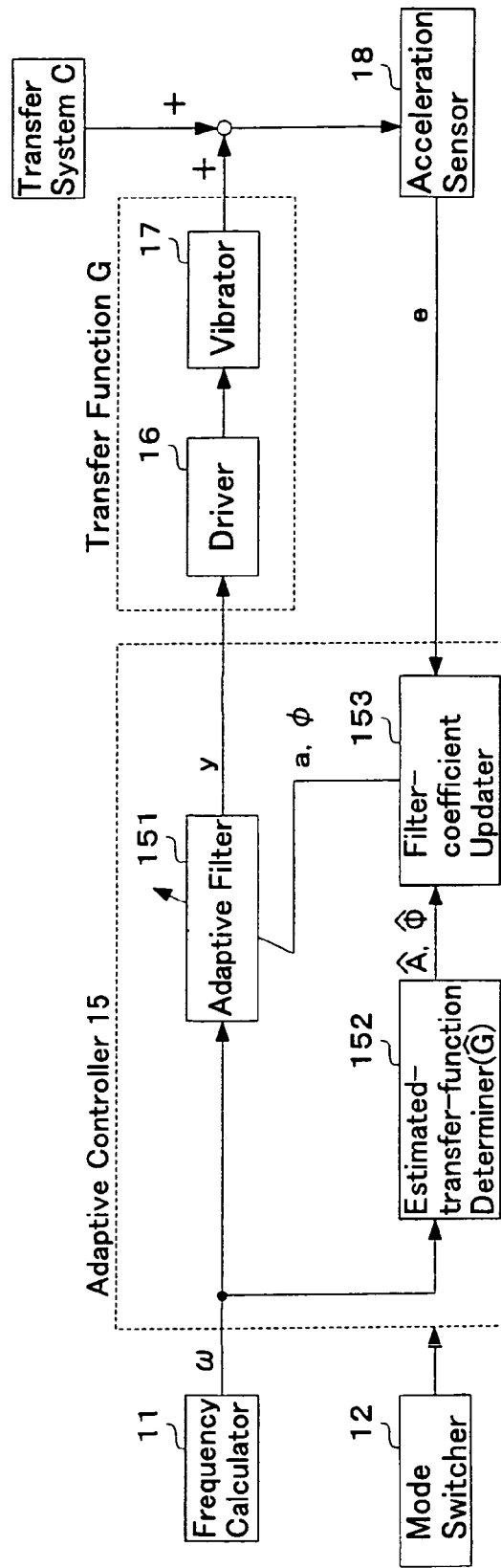
FIG. 2 is a block diagram for illustrating an arrangement of an adaptive controller 15, one of the constituent elements of the active vibration insulator 1.

Next, the detailed arrangement of the adaptive controller 15 will be hereinafter described with reference to FIG. 2. FIG. 2 is a block diagram for illustrating the arrangement of the adaptive controller 15. The adaptive controller 15 herein employs an adaptive control method, which is carried out using a retarded harmonic synthesizer minimum mean squared filter (hereinafter referred to as "DXHS-LMS" filter). Note that the adaptive controller 15 operates when the mode switcher 12 switches the map control mode to the adaptive control mode, as described above.

As illustrated in FIG. 2, the adaptive controller 15 comprises an adaptive filter 151, an estimated-transfer-function determiner 152, and a filter-coefficient updater 153. The adaptive filter 151 receives the angular frequencies ω of the cyclic pulsating signals, which the frequency calculator 11 calculates, and filter coefficients, which the filter-coefficient updater 153 updates. Moreover, the adaptive filter 151 carries out amplitude compensation and phase compensation based on these pieces of input information to generate a cyclic control signal y. In addition, the adaptive filter 151 outputs the generated cyclic control signal y to the driver 16.

The estimated-transfer-function determiner 152 stores estimated values $\hat{G}$ (hereinafter referred to as an "estimated transfer function $\hat{G}$") of a transfer function G in advance, estimated values $\hat{G}$ which depend on the angular frequencies ω. The transfer function G is a transfer function for the adaptive filter 151, transfer function G which deals with the transfer system starting from the driver 16 and arriving at the installation location of the acceleration sensor 18 by way of the vibrator 17. Moreover, the estimated-transfer-function determiner 152 determines an estimated transfer function $\hat{G}$ based on the angular frequencies ω of the cyclic pulsating signals which the frequency calculator 11 calculates. Specifically, the estimated transfer function $\hat{G}$ comprises a gain component $\hat{A}$, and a phase component $\hat{\Phi}$.

The filter-coefficient updater 153 updates the filter coefficients with the DXHS-LMS filter based on the error signals e, which the acceleration sensor 18 detects, and the estimated transfer function $\hat{G}$. Here, the filter coefficients comprise amplitude vales a, which are equivalent to filter-coefficient gains, and phase values $\phi$, which are equivalent to filter-coefficient phases. That is, the adaptive controller 15 updates the filter coefficients so as to make the error signals e, the errors at an observation point, which the acceleration sensor 18 detects, equal to zero. Moreover, the adaptive controller 15 outputs a cyclic control signal y, which is subjected to amplitude compensation and phase compensation, based on the updated filter coefficients.

(3) Detailed Arrangement of Engine Mount Equipped with Vibrator, Engine Mount which Comprises Vibrator 17 and Acceleration Sensor 18

Figure 3:
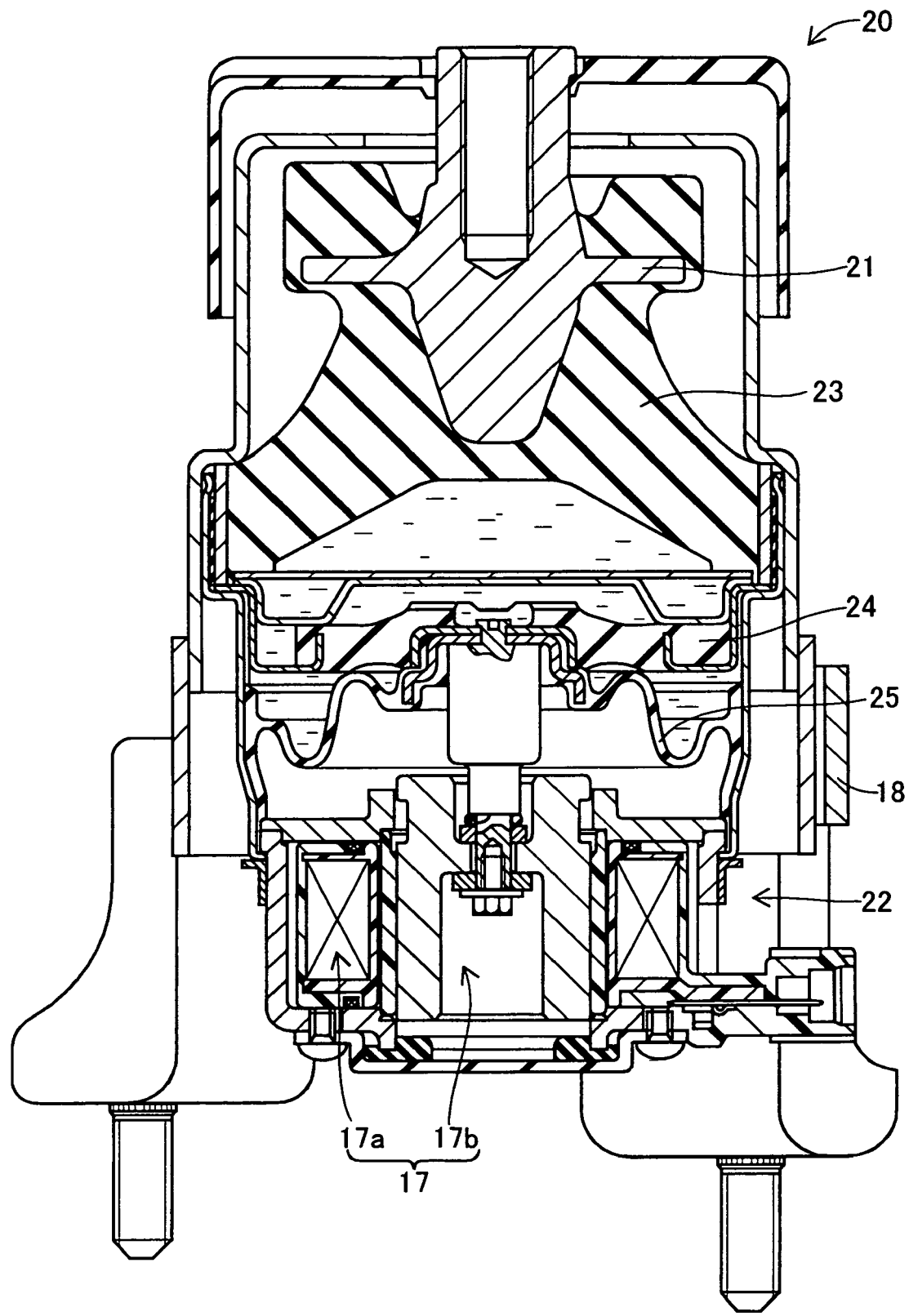
FIG. 3 illustrates a partially cross-sectional view of an engine mount 20 equipped with a vibrator.

Subsequently, a detailed arrangement of an engine mount equipped with a vibrator and comprising the vibrator 17 and acceleration sensor 18 will be hereinafter described with reference to FIG. 3. FIG. 3 illustrates a partial cross-sectional view of an engine mount 20 equipped with a vibrator.

As shown in FIG. 3, the engine mount 20 equipped with a vibrator comprises a first fixture fitting 21, and a cylinder-shaped second fitting 22. The first fixture fitting 21 is a first fixture member to be installed to the engine E/G. The second fixture fitting 22 is a second fixture member to be installed to an engine frame. The first fixture fitting 21 and the second fixture fitting 22 are separated away from each other, and are disposed to face to each other. Moreover, the engine mount 20 further comprises a main rubber elastic body 23, which is interposes between the first fixture fitting 21 and the second fixture fitting 22 to elastically connect the first fixture fitting 21 with the second fixture fitting 22.

Moreover, the engine mount 20 further comprises a substantially-disk-shaped vibratable plate 24, which is made of rubber. The vibratable plate 24 is disposed within the second fixture fitting 22 and under the main rubber elastic body 23 in FIG. 3. The vibratable plate 24 and main rubber elastic body 23 form a pressure receiving chamber into which the vibrations emitted from the E/G are input. Note a noncompressible fluid is sealed in the pressure receiving chamber. In addition, the engine mount 20 further comprises a diaphragm 25, which is formed of a thin-thickness rubber elastic film so that it is deformable readily. The diaphragm 25 is disposed within the second fixture fitting 22 and under the vibratable plate 24 in FIG. 3. The diaphragm 25 and vibratable plate 24 form an equilibrium chamber in which a noncompressible fluid is sealed, and which is allowed to undergo volume change with ease. Note that an orifice passage communicates the pressure receiving chamber with the equilibrium chamber.

The vibrator 17 comprises a substantially-cylinder-shaped core 17a, and a substantially-column-shaped plunger 17b disposed at the center of core 17a. The core 17a forms a coil in which a winding wire is wound, and is fixed to an inner peripheral surface of the second fixture fitting 22. The plunger 17b is disposed movably with respect to the core 17a axially (or in the up/down direction in FIG. 3). The plunger 17b is fixed to the vibratable plate 24 on the upper opposite-end side in FIG. 3. That is, the vibrator 17 operates to pull the plunger 17b downward in FIG. 3, depending on the electric-current supplies to the winding wire of the core 17a. Thus, the vibratable plate 24 deforms to carry out the pressure control of the receiving chamber, as the plunger 17b moves axially.

The acceleration sensor 18 is fixed to an outer periphery of the second fixture fitting 22. That is, the acceleration sensor 18 meters the vibrations of the second fixture fitting 22 of the engine mount 20 equipped with a vibrator.

(4) Inoperative Malfunction of Vibrator 17

Here, the inoperative malfunction of the vibrator 17, which the later-described malfunction-detecting processor 19 can detect, is described. The "inoperative malfunction of the vibrator 17" refers to the malfunctions that the vibrator 17 is under inoperative states. The states that vibrator 17 is inoperative refer to the instances that the coil of the vibrator 17 or the wiring connected to the coil has been broken; the plunger 17b of the vibrator 17 has been locked; and the vibratable plate 24 for supporting the plunger 17b of the vibrator 17b has been ruptured, for instance.

(5) Arrangement of Active Vibration Controller 1, Arrangement which Includes Part of Malfunction-detection Processor 19

Figure 4:
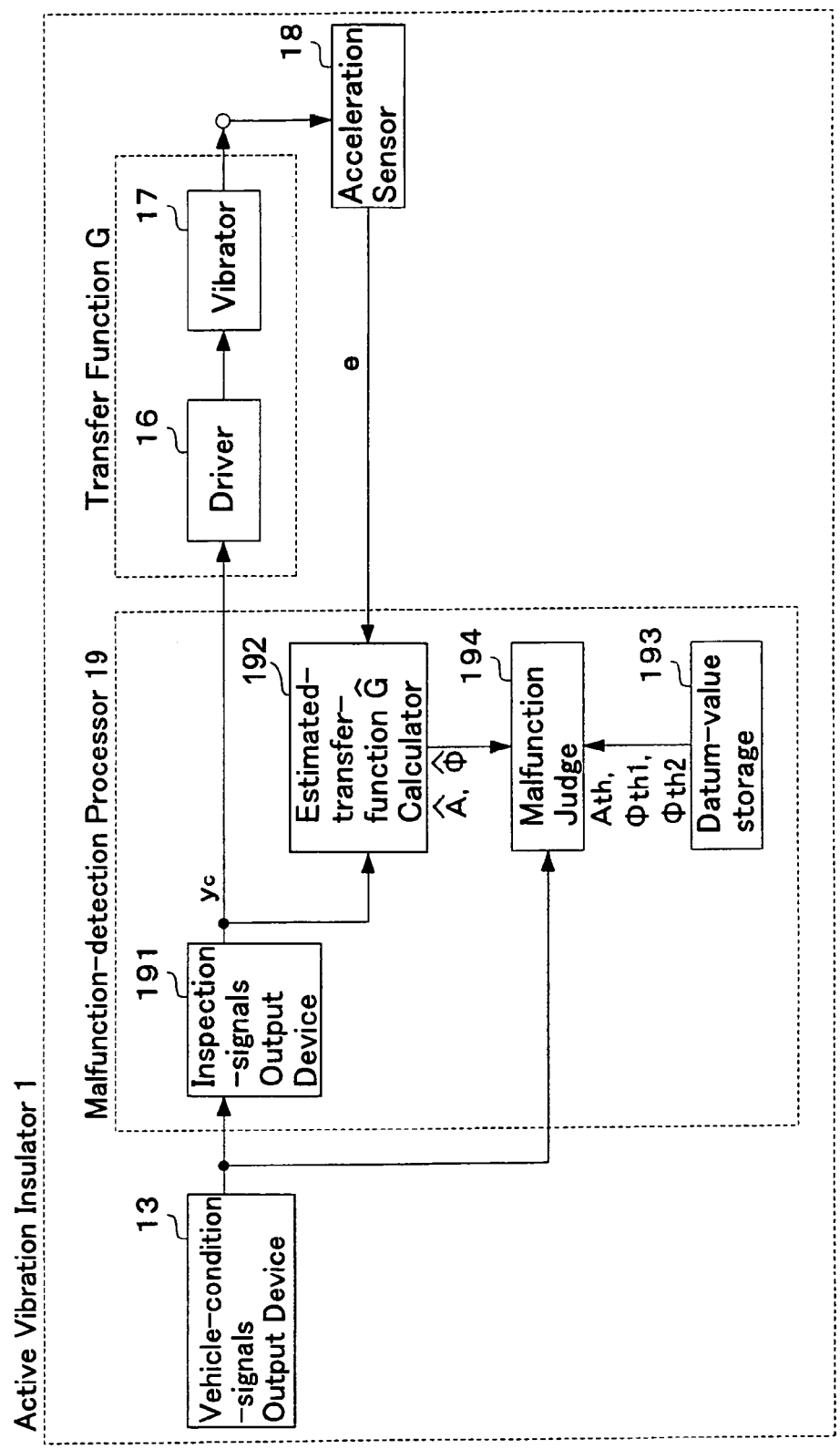
FIG. 4 is a block diagram for illustrating an arrangement of the active vibration insulator 1, arrangement which includes the part of the malfunction-detection processor 19.
Figure 5:
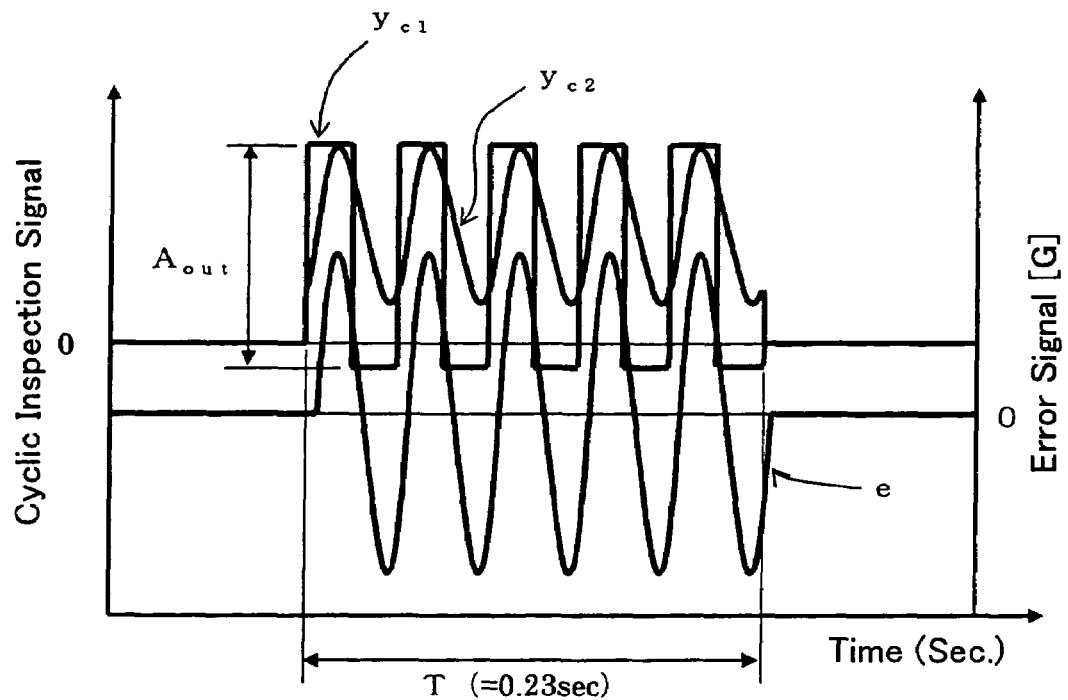
FIG. 5 is a diagram for illustrating a cyclic inspection signal $y_c$ and an error signal e.

Subsequently, an arrangement of the active vibration insulator 1, arrangement which includes part of the malfunction-detection processor 19, will be hereinafter described with reference to FIGS. 4 and 5. FIG. 4 is a block diagram for illustrating an arrangement of the active vibration insulator 1, arrangement which includes part of the malfunction-detection processor 19. FIG. 5 is a diagram for illustrating a cyclic inspection signal $y_c$ and an error signal e. Note that the cyclic inspection signal $y_c$ comprises a first cyclic inspection signal $y_{c1}$, and a second cyclic inspection signal $y_{c2}$. As shown in FIG. 4, the malfunction-detection processor 19 comprises an inspection-signals output device 191, an estimated-transfer-function calculator 192, a datum-value storage 193, and a malfunction judge 194.

The inspection-signals output device 191 receives vehicle-condition signals from the vehicle-condition-signals output device 13. When the vehicle-condition signals specify that vehicle conditions are equivalent to predetermined conditions, the inspection-signals output device 191 generates a cyclic inspection signal $y_c$ whose frequency is 20 Hz and amplitude is $A_{out}$ for a time period of T, as shown in FIG. 5. Then, the inspection-signals output device 191 outputs the generated cyclic inspection signal $y_c$ to the driver 16. That is, the driver 16 actuates the vibrator 17 based on the cyclic inspection signal $y_c$. Note that the inspection-signals output device 191 uses one of the first cyclic inspection signal $y_{c1}$ and second cyclic inspection signal $y_{c2}$ selectively. The first cyclic inspection signal $y_{c1}$ comprises a rectangle-shaped wave which is calculated according to equation 1 (1). The second cyclic inspection signal $y_{c2}$ comprises a sine wave which is calculated according to equation 1 (2).

$$y_{c1} = A_{out} \cdot \sin(\omega \cdot \Delta T \cdot n) + \text{offset1} \qquad \text{Equation 1 (1)}$$

when $y_{c1} \geq 0$, $y_{c1} = A_{out}$; and
when $y_{c1} < 0$, $y_{c1} = y0$ $$y_{c1} = A_{out} \cdot \sin(\omega \cdot \Delta T \cdot n) + \text{offset1} \qquad \text{Equation 1 (2)}$$

$y_{c1}$ and $y_{c2}$: Cyclic Inspection Signal
$A_{out}$: Vibration Amplitude
$\omega$: Angular Frequency
$\Delta T$: Sampling Cycle
n: Sampling Number (time)
offset1: Offset for Output Calculated Value
y0: Negative Constant Here, the "vehicle condition, which generates the cyclic inspection signal $y_c$, is equivalent to a predetermined condition" refers to such conditions as immediately after turning on an ignition switch of a vehicle, a vehicle being under idling, and after a predetermined time has passed since an ignition switch of a vehicle is turned on and the vehicle is under idling. Moreover, "vehicle being under idling" refers to conditions that an engine of the vehicle is running; a speed of the vehicle is smaller than a predetermined value; and additionally a shift position of an automatic transmission for the vehicle is placed at the "N (neutral)" range or "P (parking)" range.

Note that the duration time T for the cyclic inspection signal $y_c$ is made variable depending on the vehicle conditions. Specifically, immediately after an ignition switch of a vehicle is turned on, the duration time T for the cyclic inspection signal $y_c$ is set at about 0.23 sec. Therefore, in this instance, the cyclic inspection signal $y_c$ comprises an approximately five-component-wave rectangle-shaped wave whose amplitude is $A_{out}$. Moreover, when a vehicle is under idling, or after a predetermined time has passed since an ignition switch of a vehicle is turned on and the vehicle is under idling, the duration time T for the cyclic inspection signal $y_c$ is set at about 0.35 sec. Therefore, in this instance, the cyclic inspection signal $y_c$ comprises an approximately seven-component-wave rectangle-shaped wave whose amplitude is $A_{out}$.

Moreover, the amplitude $A_{out}$ of the cyclic inspection signal $y_c$ is such an amplitude that vehicle passengers cannot physically sense the vibrations, which the vibrator 17 generates. Specifically, the amplitude $A_{out}$ of the cyclic inspection signal $y_c$ is set at an amplitude that the vibrating forces, which the vibrator 17 produces, exhibit a magnitude of about 5 Nrms or less. In addition, the amplitude $A_{out}$ is made variable depending on the vehicle conditions. Specifically, the amplitude $A_{out}$ for the instance immediately after an ignition switch of a vehicle differs from the amplitude $A_{out}$ for the instance when a vehicle is under idling, or the amplitude $A_{out}$ for the instance after a predetermined time has passed since an ignition switch of a vehicle is turned on and the vehicle is under idling. More specifically, the amplitude $A_{out}$ for the instance immediately after an ignition switch of a vehicle is made smaller than the amplitude $A_{out}$ for the instance when a vehicle is under idling, or the amplitude $A_{out}$ for the instance after a predetermined time has passed since an ignition switch of a vehicle is turned on and the vehicle is under idling.

Moreover, the duration time T for the cyclic inspection signal $y_c$ is such a time that vehicle passengers cannot physically sense the vibrations, which the vibrator 17 generates. In addition, the duration time T is made variable depending on the vehicle conditions. Specifically, the duration time T for the instance immediately after an ignition switch of a vehicle differs from the duration time T for the instance when a vehicle is under idling, or the duration time T for the instance after a predetermined time has passed since an ignition switch of a vehicle is turned on and the vehicle is under idling, as described above. More specifically, the duration time T for the instance immediately after an ignition switch of a vehicle is made smaller than the duration time T for the instance when a vehicle is under idling, or the duration time T for the instance after a predetermined time has passed since an ignition switch of a vehicle is turned on and the vehicle is under idling.

Note that it is possible not only to inhibit vehicle passengers from physically sensing the vibrations, which the vibrator 17 generates, but also to make the noises of actuating the vibrator 17 inaudible, by thus actuating the vibrator 17 with the low-frequency and low-amplitude cyclic inspection signal $y_c$ for a short period of time.

The estimated-transfer-function calculator 192 (i.e., calculator) receives the cyclic inspection signal $y_c$, which the inspection-signals output device 191 generates, and the error signal e, which the acceleration sensor 18 detects. Here, the vehicle condition, for which the inspection-signals output device 191 outputs the cyclic inspection signal $y_c$, is such a state that the vibrations resulting from the engine E/G are very small. Accordingly, the most part of the error signal e, which the acceleration sensor 18 detects, is the vibrations, which are generated when the driver 16 actuates the vibrator 17 based on the cyclic inspection signal $y_c$. Note that FIG. 5 illustrates the error signal e.

Then, the estimated-transfer-function calculator 192 calculates an estimated transfer function $\hat{G}$, based on the input cyclic inspection signal $y_c$ and error signal e, for an instance when the inspection-signals output device 191 outputs the cyclic inspection signal $y_c$. Here, the estimated transfer function $\hat{G}$ comprises an estimated value $\hat{A}$ for gain, and an estimated value $\hat{\Phi}$ for phase. Specifically, the estimated-transfer-function calculator 192 calculates the gain component $\hat{A}$ and phase component $\hat{\Phi}$ of the estimated transfer function $\hat{G}$ according to equation (2) and equation (3), respectively.

$$Xir = \sum_{n=0}^{N-1} e_n \cdot \cos(\omega \cdot \Delta T \cdot n) \quad \text{Equation (2)}$$

$$Xii = \sum_{n=0}^{N-1} e_n \cdot \sin(\omega \cdot \Delta T \cdot n)$$

$$Xor = \sum_{n=0}^{N-1} A_{out} \cdot \sin(\omega \cdot \Delta T \cdot n) \cdot \cos(\omega \cdot \Delta T \cdot n)$$

$$Xoi = \sum_{n=0}^{N-1} A_{out} \cdot \sin^2(\omega \cdot \Delta T \cdot n)$$

$Xir$: Input Real-number Part $Xii$: Input Imaginary-number Part $Xor$: Output Real-number Part $Xoi$: Output Imaginary-number Part $e_n$: Error Signal $$\hat{A} = \sqrt{Xir^2 + Xii^2} / \sqrt{Xor^2 + Xoi^2}$$

$$\hat{\Phi} = \tan^{-1}(Xii/Xir) - \tan^{-1}(Xoi/Xor) \quad \text{Equation (3)}$$

$\hat{A}$: Gain Component of Estimated Transfer Function $\hat{\Phi}$: Phase Component of Estimated Transfer Function The datum-value storage 193 (i.e., storage) stores a gain threshold value (i.e., datum gain threshold value) $A_{th}$, a lower-limit phase threshold value (i.e., datum phase range) $\Phi_{th1}$, and an upper-limit phase threshold value (i.e., datum phase range) $\Phi_{th2}$, depending on vehicle conditions. Specifically, the datum-value storage 193 stores a gain threshold value $A_{th}$, a lower-limit phase threshold value $\Phi_{th1}$ and an upper-limit phase threshold value $\Phi_{th2}$ for the instance immediately after turning on the ignition switch, and stores a gain threshold value $A_{th}$, a lower-limit phase threshold value $\Phi_{th1}$ and an upper-limit phase threshold value $\Phi_{th2}$ for the instance when the vehicle is under idling, or for the instance after a predetermined time has passed since the ignition switch is turned on and the vehicle is under idling, respectively.

The malfunction judge 194 (i.e., judge) receives not only the gain component $A\hat{}$ and phase component $\Phi\hat{}$ of the estimated transfer function $G\hat{}$ from the estimated-transfer-function calculator 192, but also vehicle-condition signals from the vehicle-condition-signals output device 13. Moreover, the malfunction judge 194 receives the gain threshold value $A_{th}$, lower-limit phase threshold value $\Phi_{th1}$ and upper-limit phase threshold value $\Phi_{th2}$ which the datum-value storage 193 outputs. Note that the gain threshold value $A_{th}$, lower-limit phase threshold value $\Phi_{th1}$ and upper-limit phase threshold value $\Phi_{th2}$ correspond to one of vehicle conditions specified by the vehicle-condition signals which the vehicle-condition-signals output device 13 outputs.

Then, the malfunction judge 194 compares the gain component $A\hat{}$ of the estimated transfer function $G\hat{}$ with the gain threshold value $A_{th}$. When the gain component $A\hat{}$ of the estimated transfer function $G\hat{}$ is smaller than the gain threshold value $A_{th}$, the malfunction judge 194 judges that the vibrator 17 is under the inoperative malfunction. Moreover, the malfunction judge 194 compares the phase component $\Phi\hat{}$ of the estimated transfer function $G\hat{}$ with the lower-limit phase threshold value $\Phi_{th1}$ and upper-limit phase threshold value $\Phi_{th2}$. When the phase component $\Phi\hat{}$ of the estimated transfer function $G\hat{}$ is smaller than the lower-limit phase threshold value $\Phi_{th1}$, or when the phase component $\Phi\hat{}$ of the estimated transfer function $G\hat{}$ is larger than the upper-limit phase threshold value $\Phi_{th2}$, the malfunction judge 194 judges that the vibrator 17 is under the inoperative malfunction. That is, when the phase component $\Phi\hat{}$ of the estimated transfer function $G\hat{}$ does not fall within a range of from the lower-limit phase threshold value $\Phi_{th1}$ to the upper-limit phase threshold value $\Phi_{th2}$, the malfunction judge 194 that the vibrator 17 is under the inoperative malfunction.

In addition, when the malfunction judge 194 judges that the vibrator 17 is under the inoperative malfunction, the malfunction judges 194 carries out malfunction processing which makes control for activating the above-described map controller 14 or adaptive controller 15 (hereinafter referred to as "ordinary control") inexecutable. Moreover, when the malfunction judge 194 judges that the vibrator 17 is under the inoperative malfunction, the driver 16 does not operate either. However, when the ignition switch is turned on again, the malfunction judge 194 carries out the malfunction judgement again. When the malfunction judge 194 judges that the vibrator 17 operates normally, the malfunction judge 194 makes the ordinary control executable again.

(6) Processing Operations of Active Vibration Insulator 1

Figure 6:
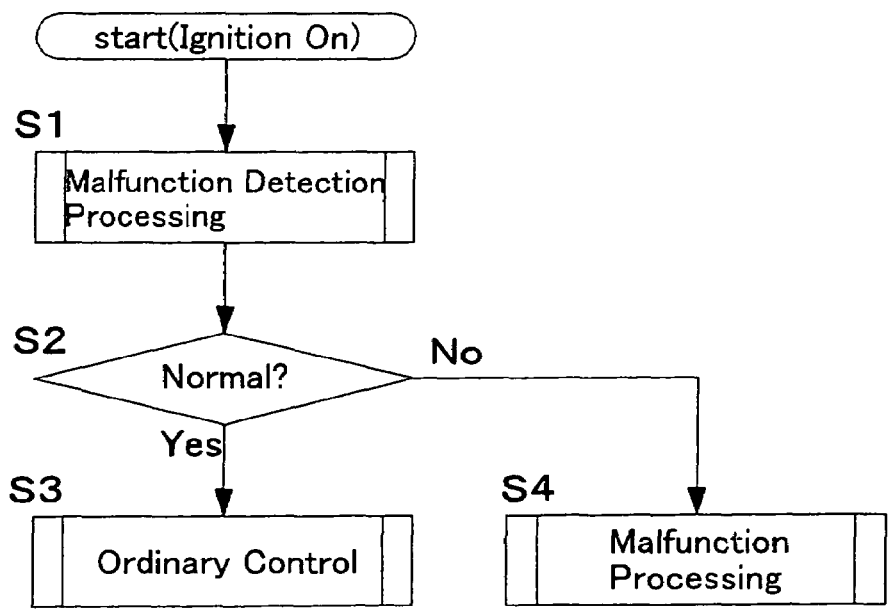
FIG. 6 is a flowchart for illustrating a first main processing operation of the active vibration insulator 1.
Figure 7:
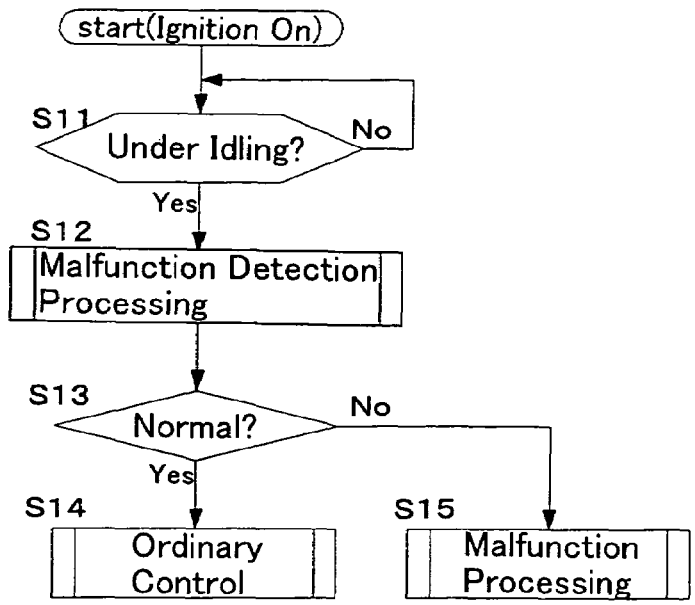
FIG. 7 is a flowchart for illustrating a second main processing operation of the active vibration insulator 1.
Figure 8:
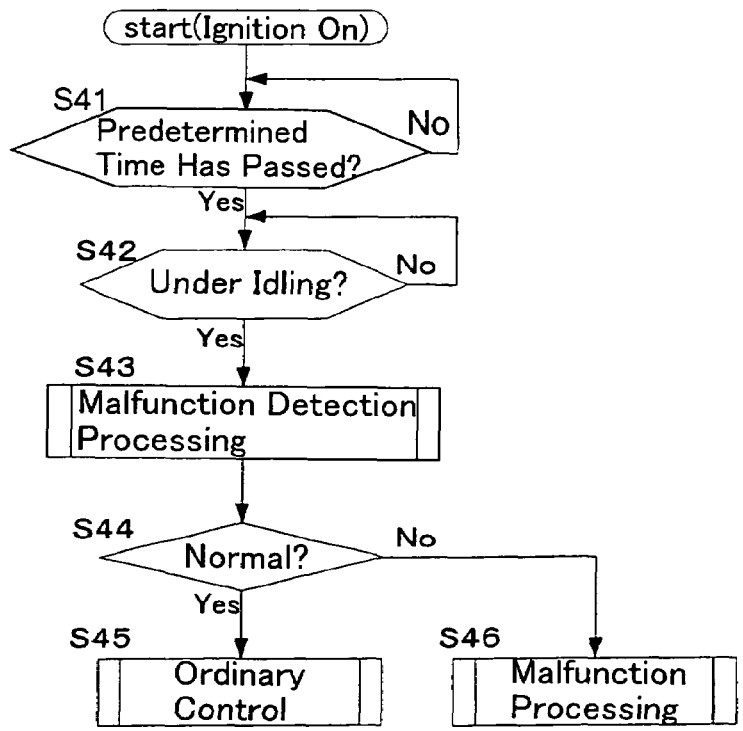
FIG. 8 is a flowchart for illustrating a third main processing operation of the active vibration insulator 1.
Figure 9:
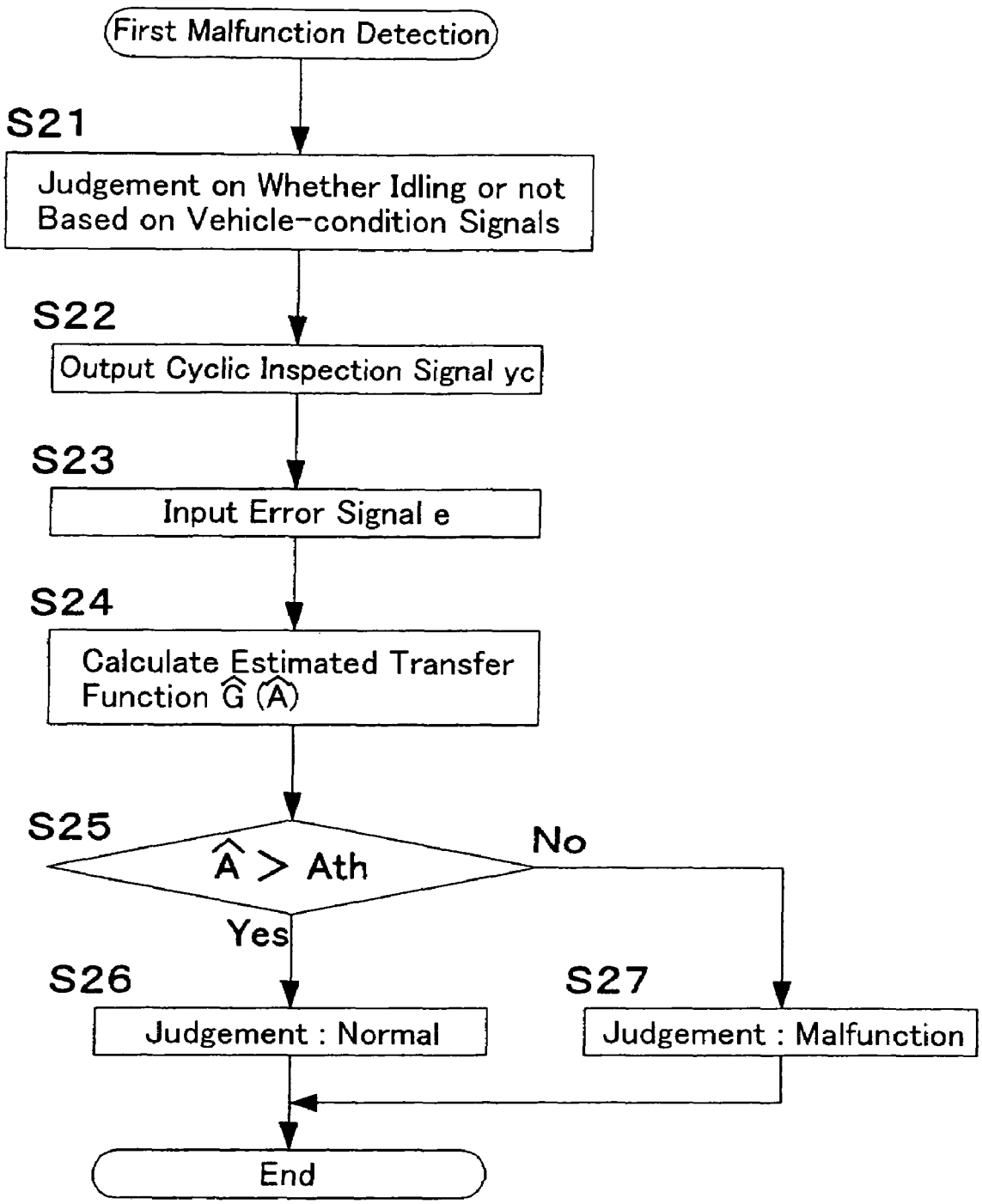
FIG. 9 is a flowchart for illustrating a first malfunction-detection processing operation of the active vibration insulator 1.
Figure 10:
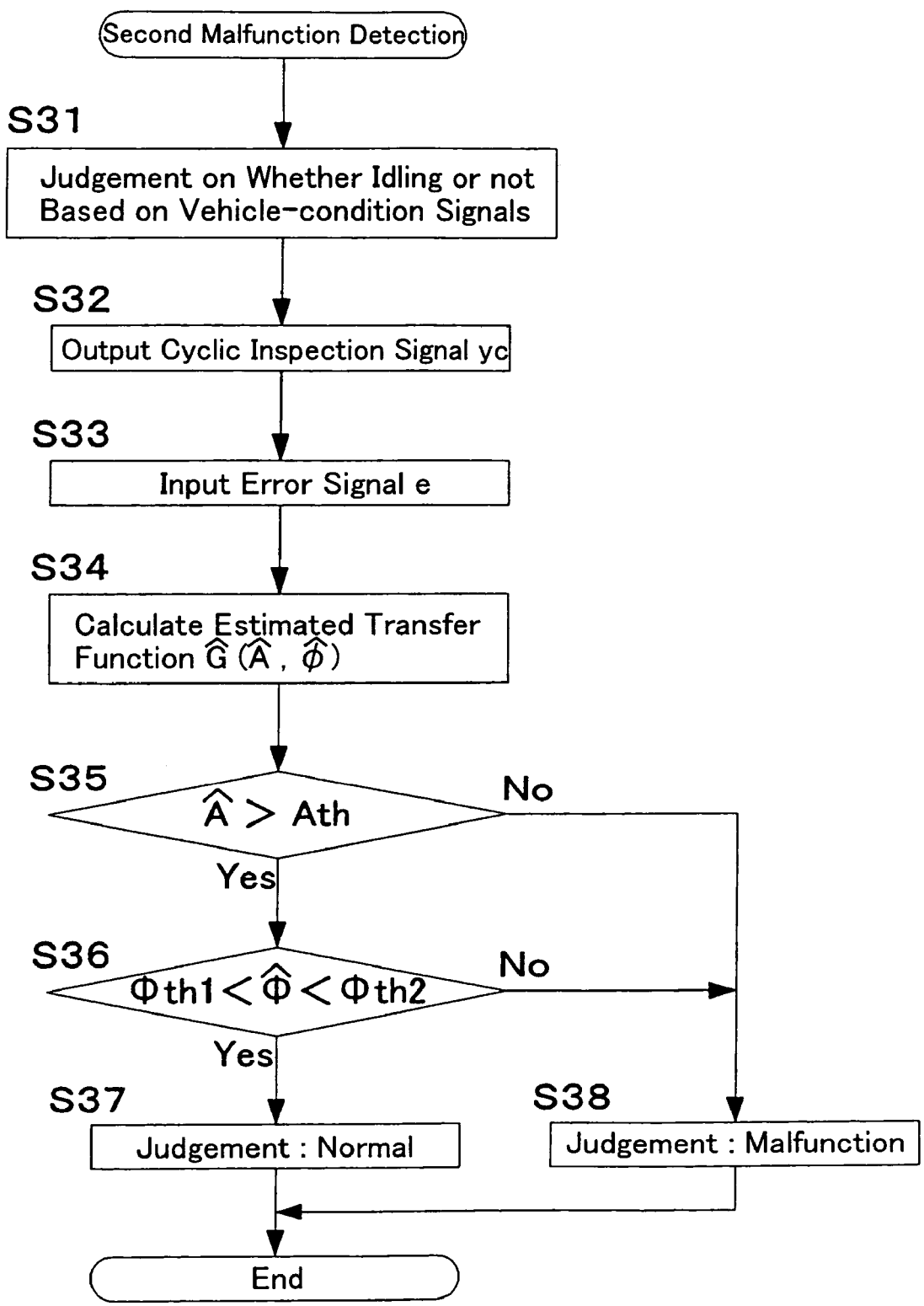
FIG. 10 is a flowchart for illustrating a second malfunction-detection processing operation of the active vibration insulator 1.

Hereinafter, processing operations of the active vibration insulator 1 arranged as described above will be described with reference to flowcharts shown in FIGS. 6 through 10. FIG. 6 is a flowchart for illustrating a first main processing operation of the active vibration insulator 1. FIG. 7 is a flowchart for illustrating a second main processing operation of the active vibration insulator 1. FIG. 8 is a flowchart for illustrating a third main processing operation of the active vibration insulator 1. FIG. 9 is a flowchart for illustrating a first malfunction-detection processing operation of the active vibration insulator 1. FIG. 10 is a flowchart for illustrating a second malfunction-detection processing operation of the active vibration insulator 1. Note that the active vibration insulator 1 selects one of the first, second and third main processing operations, and carries out the selected one. In certain cases, however, the active vibration insulator 1 can execute the first and second main processing operations parallelly, or execute the first and third main processing operations parallelly. Moreover, the active vibration insulator 1 selects one of the first and second malfunction-detection processing operations, and carries out the selected one.

(6.1) Main Processing Operations

To begin with, the main processing operations of the active vibration insulator 1 will be described. Firstly, the first main processing operation will be hereinafter described with reference to FIG. 6.

As illustrated in FIG. 6, the first main processing operation, which the active vibration insulator 1 carries out, starts when the ignition switch is turned on. The active vibration insulator 1, which has initiated the first main processing operation, carries out the malfunction-detection processing on the vibrator 17 at step S1. When the active vibration insulator 1 judges that the vibrator 17 operates normally, that is, when the answer is "Yes" at step S2, the active vibration insulator 1 carries out the ordinary control at step S3. Under the ordinary control, the map controller 14 or the adaptive controller 15 controls the vibrator 17 to vibrate so as to actively inhibit the vibrations, which the engine E/G generates, from transmitting to the vehicle's specific parts.

On the other hand, when the active vibration insulator 1 judges that the vibrator 17 operates abnormally in the malfunction-detection processing, that is, when the answer is "No" at step S2, the active vibration insulator 1 finishes the first main processing operation to carry out a malfunction processing. The malfunction processing herein specifies a processing for not carrying out the above-described ordinary control, that is, a processing for terminating the ordinary control. However, the malfunction processing is canceled when the ignition switch is turned on again. That is, when the ignition switch is turned on again, the active vibration insulator 1 re-executes the first main processing operation. Then, when the active vibration insulator 1 judges that the vibrator 17 operates normally, the active vibration insulator 1 carries out the ordinary control again.

Specifically, in the first main processing operation, the malfunction-detection processing is initiated immediately after the ignition switch is turned on. Here, note that vibrations, which result from the vehicle component parts other than the vibrator 17, affect the active vibration insulator 1 less immediately after the ignition switch is turned on. Therefore, the active vibration insulator 1 can calculate the estimated transfer function $G\hat{}$ with higher accuracy when calculating the estimated transfer function $G\hat{}$ in the later-described malfunction-detection processing. As a result, it is possible to improve the judging accuracy when the active vibration insulator 1 judges whether the vibrator 17 is under the inoperative malfunction.

Secondly, the second main processing operation, which the active vibration insulator 1 carries out, will be hereinafter described with reference to FIG. 7. As illustrated in FIG. 7, the second main processing operation starts when the ignition switch is turned on. The active vibration insulator 1, which has initiated the second main processing operation, judges whether the vehicle is under idling based on the vehicle-condition signals, which the vehicle-condition-signals output device 13 outputs, at step S11. Here, the "vehicle under idling" specifies the instance when the engine E/G is running; the vehicle speed is less than a predetermined value; and additionally a shift position of an automatic transmission for the vehicle is placed at the "N (neutral)" range or "P (parking)" range. That is, the malfunction-detection judge 194 retrieves the signals on the engine-running conditions, vehicle speeds and shift positions to judge whether the vehicle is under idling or not. When the active vibration insulator 1 judges that the vehicle is not under idling, that is, when the answer is "No" at step S11, the active vibration insulator 1 repeats the judgement processing until it judges that the vehicle is under running. On the other hand, when the active vibration insulator 1 judges that the vehicle is under idling, that is, when the answer is "Yes" at step S11, the active vibration insulator 1 carries out the malfunction-detection processing whether the vibrator 17 is under the inoperative malfunction at step S12. When the active vibration insulator 1 judges that the vibrator 17 operates normally in the malfunction-detection processing, that is, when the answer is "Yes" at step S13, the active vibration insulator 1 carries out the ordinary control at step S14. On the other hand, when the active vibration insulator 1 judges that the vibrator 17 operates abnormally in the malfunction-detection processing, that is, when the answer is "No" at step S13, the active vibration insulator 1 finishes the second main processing operation to carry out a malfunction processing operation at step S15.

Note that, in the second main processing operation, the active vibration insulator 1 can carry out the ordinary control when the vehicle is put quickly in running, without being put in idling, immediately after the ignition switch is turned on. That is, the vibrator 17 is put in the ordinary control without carrying out the malfunction-detection processing. In this instance, the active vibration insulator 1 can carry out the malfunction-detection processing when the vehicle is put in idling from under running. To put it differently, the active vibration insulator 1 can carry out the malfunction-detection processing when the vehicle is put in idling for the first time after the ignition switch is turned on. Of course, the active vibration controller 1 can carry out the malfunction-detection processing not only when the vehicle is put in idling for the first time after the ignition switch is turned on, but also continuously.

Moreover, the active vibration insulator 1 can carry out the second main processing operation parallelly to the first main processing operation. When the active vibration insulator 1 executes both of the first main processing operation and the second main processing operation parallelly, if the active vibration insulator 1 executes the ordinary control in one of the main processing operations, the active vibration insulator 1 may execute the other one of the main processing operations interruptedly. That is, when the active vibration insulator 1 executes the ordinary control in one of the main processing operations, if the active vibration insulator 1 executes the other one of the main processing operations, the active vibration insulator 1 should execute the malfunction-detection processing in the other one of the main processing operations. For example, when the active vibration insulator 1 judges that the vibrator 17 operates normally in the malfunction-detection processing immediately after the ignition switch is turned on, the active vibration insulator 1 executes the ordinary control at step S3 shown in FIG. 6 in the first main processing operation. In this instance, the active vibration insulator 1 should execute the second main processing operation interruptedly when the vehicle condition is put in idling. Then, the active vibration insulator 1 carries out the ordinary control when it judges that the vibrator 17 operates normally in the malfunction-detection processing of the second main processing operation.

Specifically, in the second main processing operation, the malfunction-detection processing is initiated when the vehicle is under idling. Here, note that vibrations, which result from vehicle component parts other than the vibrator 17, affect the active vibration insulator 1 less when the vehicle is under idling. Therefore, the active vibration insulator 1 can calculate the estimated transfer function $\hat{G}$ with higher accuracy when calculating the estimated transfer function $\hat{G}$ in the later-described first and second malfunction-detection processing operations. As a result, it is possible to improve the judging accuracy when the active vibration insulator 1 judges whether the vibrator 17 is under the inoperative malfunction.

Thirdly, the third main processing operation, which the active vibration insulator 1 carries out, will be hereinafter described with reference to FIG. 8. As illustrated in FIG. 8, the third main processing operation starts when the ignition switch is turned on. The active vibration insulator 1, which has initiated the third main processing operation, judges whether the time, which has elapsed since the ignition switch is turned on, reaches a predetermined time at step S41. Here, the "predetermined time" specifies a time period, which is determined while taking a time for completely pre-charging a capacitor included in the driver 16, or a time for putting the acceleration sensor 18 in a stabilized state.

Subsequently, the active vibration insulator 1 judges whether the vehicle is under idling or not at step S42, based on the vehicle-condition signals which the vehicle-condition-signals output device 13 outputs. Here, the "vehicle under idling" specifies the instance when the engine E/G is running; the vehicle speed is less than a predetermined value; and additionally a shift position of an automatic transmission for the vehicle is placed at the "N (neutral)" range or "P (parking)" range. That is, the malfunction-detection judge 194 retrieves the signals on the engine-running conditions, vehicle speeds and shift positions to judge whether the vehicle is under idling or not.

When the active vibration insulator 1 judges that the vehicle is not under idling, that is, when the answer is "No" at step S42, the active vibration insulator 1 repeats the judgement processing until it judges that the vehicle is under running. On the other hand, when the active vibration insulator 1 judges that the vehicle is under idling, that is, when the answer is "Yes" at step S42, the active vibration insulator 1 carries out the malfunction-detection processing whether the vibrator 17 is under the inoperative malfunction at step S43. When the active vibration insulator 1 judges that the vibrator 17 operates normally in the malfunction-detection processing, that is, when the answer is "Yes" at step S44, the active vibration insulator 1 carries out the ordinary control at step S45. On the other hand, when the active vibration insulator 1 judges that the vibrator 17 operates abnormally in the malfunction-detection processing, that is, when the answer is "No" at step S44, the active vibration insulator 1 finishes the third main processing operation to carry out a malfunction processing operation at step S46.

Note that, in the third main processing operation, the active vibration insulator 1 can carry out the ordinary control when the vehicle is put quickly in running, before being put in idling, after a predetermined period of time has passed since the ignition switch is turned on. That is, the vibrator 17 is put in the ordinary control without carrying out the malfunction-detection processing. In this instance, the active vibration insulator 1 can carry out the malfunction-detection processing when the vehicle is put in idling from under running. Note that, in this instance, a predetermined period of time has passed naturally since the ignition switch is turned on. To put it differently, the active vibration insulator 1 can carry out the malfunction-detection processing when the vehicle is put in idling for the first time after the ignition switch is turned on. Of course, the active vibration controller 1 can carry out the malfunction-detection processing not only when the vehicle is put in idling for the first time after the ignition switch is turned on, but also continuously.

Moreover, the active vibration insulator 1 can carry out the third main processing operation parallelly to the first main processing operation. When the active vibration insulator 1 executes both of the first main processing operation and the third main processing operation parallelly, if the active vibration insulator 1 executes the ordinary control in one of the main processing operations, the active vibration insulator 1 may execute the other one of the main processing operations interruptedly. That is, when the active vibration insulator 1 executes the ordinary control in one of the main processing operations, if the active vibration insulator 1 executes the other one of the main processing operations, the active vibration insulator 1 should execute the malfunction-detection processing in the other one of the main processing operations. For example, when the active vibration insulator 1 judges that the vibrator 17 operates normally in the malfunction-detection processing immediately after the ignition switch is turned on, the active vibration insulator 1 executes the ordinary control at step S3 shown in FIG. 6 in the first main processing operation. In this instance, the active vibration insulator 1 should execute the third main processing operation interruptedly when the vehicle condition is put in idling after a predetermined time has passed since the ignition switch is turned on. Then, the active vibration insulator 1 carries out the ordinary control again when it judges that the vibrator 17 operates normally in the malfunction-detection processing of the third main processing operation.

Specifically, in the third main processing operation, the malfunction-detection processing is initiated when the vehicle is under running and after a predetermined period of time has passed since the ignition switch is turned on. Here, when the vehicle is under idling, vibrations, which result from vehicle component parts other than the vibrator 17, affect the active vibration insulator 1 less, as described in the second main processing operation. Moreover, since the active vibration insulator 1 carries out the malfunction-detection processing after a predetermined time has passed since the ignition switch is turned on, the capacitor included in the driver 16 is pre-charged and the acceleration sensor is stabilized when carrying out the malfunction-detection processing. Therefore, the active vibration insulator 1 can calculate the estimated transfer function $\hat{G}$ with higher accuracy when calculating the estimated transfer function $\hat{G}$ in the later-described first and second malfunction-detection processing operations. As a result, it is possible to improve the judging accuracy when the active vibration insulator 1 judges whether the vibrator 17 is under the inoperative malfunction.

(6.2) Malfunction-detection Processing Operations

Fourthly, the first malfunction-detection processing operation for the vibrator 17 will be described with reference to FIG. 9. First of all, in the first malfunction-detection processing operation, the active vibration insulator 1 first judges whether the vehicle is under idling or not at step S21, based on the vehicle-condition signals which the vehicle-condition-signals output device 13 outputs, as shown in FIG. 9. Here, "the vehicle is not under idling" refers to the instance when the ignition switch is turned on, because the active vibration insulator 1 carries out the first malfunction-detection processing when the ignition switch is turned on and when the vehicle is under idling.

Subsequently, the inspection-signals output device 191 outputs the cyclic inspection signal $y_c$ at step S22. Note that, however, the output cyclic inspection signal $y_c$ differs between the instances when the ignition switch is turned on and when the vehicle is under idling, respectively. After the inspection-signals output device 191 outputs the cyclic inspection signal $y_c$, the acceleration sensor 18 outputs the error signal e to the estimated-transfer-function calculator 192 at step S23. Then, the estimated-transfer-function calculator 192 calculates the gain component $\hat{A}$ of the estimated transfer function $\hat{G}$ according to above-described equations (2) and (3) at step S24, based on the input cyclic inspection signal $y_c$ and error signal e.

Thereafter, the active vibration insulator 1 compares the calculated gain component $\hat{A}$ of the estimated transfer function $\hat{G}$ with the gain threshold value $A_{th}$, which is stored in the datum-value storage 193, at step S25. Here, the gain threshold value $A_{th}$, which is compared with the calculated gain component $\hat{A}$ of the estimated transfer function $\hat{G}$, is one of the gain threshold values $A_{th}$, which depend on vehicle conditions. That is, the gain threshold value $A_{th}$ differs between the instances when the ignition switch is turned on and when the vehicle is under idling, respectively.

Finally, when the gain component $\hat{A}$ of the estimated transfer function $\hat{G}$ is larger than the gain threshold value $A_{th}$, that is, when the answer is "Yes" at step S25, the active vibration insulator 1 judges that the vibrator 17 operates normally at step S26, and finishes the first malfunction-detection processing operation. On the other hand, when the gain component $\hat{A}$ of the estimated transfer function $\hat{G}$ is the gain threshold value $A_{th}$ or less, that is, when the answer is "No" at step S25, the active vibration insulator 1 judges that the vibrator 17 is under the inoperative malfunction at step S27, and finishes the first malfunction-detection processing operation.

Fifthly, the second malfunction-detection processing operation for the vibrator 17 will be described with reference to FIG. 10. First of all, in the second malfunction-detection processing, the active vibration insulator 1 first judges whether the vehicle is under idling at step S31, based on the vehicle-condition signals which the vehicle-condition-signals output device 13 outputs, as shown in FIG. 10. Subsequently, the inspection-signals output device 191 outputs the cyclic inspection signal $y_c$ at step S32. Note that, however, the output cyclic inspection signal $y_c$ differs between the instances when the ignition switch is turned on and when the vehicle is under idling, respectively.

After the inspection-signals output device 191 outputs the cyclic inspection signal $y_c$, the acceleration sensor 18 outputs the error signal e to the estimated-transfer-function calculator 192 at step S33. Then, the estimated-transfer-function calculator 192 calculates the gain component $\hat{A}$ and phase component $\hat{\Phi}$ of the estimated transfer function $\hat{G}$ according to above-described equations (2) and (3) at step S34, based on the input cyclic inspection signal $y_c$ and error signal e.

Thereafter, the active vibration insulator 1 compares the calculated gain component $\hat{A}$ of the estimated transfer function $\hat{G}$ with the gain threshold value $A_{th}$, which is stored in the datum-value storage 193, at step S35. Here, the gain threshold value $A_{th}$, which is compared with the calculated gain component $\hat{A}$ of the estimated transfer function $\hat{G}$, is one of the gain threshold values $A_{th}$, which depend on vehicle conditions. That is, the gain threshold value $A_{th}$ differs between the instances when the ignition switch is turned on and when the vehicle is under idling, respectively.

Then, when the gain component $\hat{A}$ of the estimated transfer function $\hat{G}$ is larger than the gain threshold value $A_{th}$, that is, when the answer is "Yes" at step S35, the active vibration insulator 1 compares the calculated phase component $\hat{\Phi}$ of the estimated transfer function $\hat{G}$ with the lower-limit phase threshold value $\Phi_{th1}$ and upper-limit phase threshold value $\Phi_{th2}$, which are stored in the datum-value storage 193, at step S36. Here, the lower-limit phase threshold value $\Phi_{th1}$ and upper-limit phase threshold value $\Phi_{th2}$, which are compared with the calculated phase component $\hat{\Phi}$ of the estimated transfer function $\hat{G}$, are one of the paired lower-limit phase threshold value $\Phi_{th1}$ and upper-limit phase threshold value $\Phi_{th2}$, which depend on vehicle conditions. That is, the lower-limit phase threshold value $\Phi_{th1}$ and upper-limit phase threshold value $\Phi_{th2}$ differ between the instances when the ignition switch is turned on and when the vehicle is under idling, respectively.

Finally, when the phase component $\hat{\Phi}$ of the estimated transfer function $\hat{G}$ falls within a range of from the lower-limit phase threshold value $\Phi_{th1}$ to the upper-limit phase threshold value $\Phi_{th2}$, that is, the answer is "Yes" at step S36, the active vibration insulator 1 judges that the vibrator 17 operates normally at step S37, and finishes the second malfunction-detection processing operation. On the other hand, when the gain component $\hat{A}$ of the estimated transfer function $\hat{G}$ is the gain threshold value $A_{th}$ or less, that is, when the answer is "No" at step S35, and when the phase component $\hat{\Phi}$ of the estimated transfer function $\hat{G}$ does not fall within a range of from the lower-limit phase threshold value $\Phi_{th1}$ to the upper-limit phase threshold value $\Phi_{th2}$, that is, the answer is "No" at step S36, the active vibration insulator 1 judges that the vibrator 17 is under the inoperative malfunction at step S38, and finishes the second malfunction-detection processing operation.

(7) Supplement

In the above-described active vibration insulator 1 according to an example of the present invention, the map control mode is switched to the adaptive control mode, or vise versa. However, the present invention is not limited to such an example. For example, the active vibration insulator 1 can employ the map control mode alone, or can employ the adaptive control mode alone. Specifically, when the active vibration insulator 1 employs the map control mode alone, it is constructed free of the mode switcher 12, the adaptive controller 15 and the acceleration sensor 18. In this instance, only the map controller 14 outputs the cyclic inspection signal y to the driver 16. Moreover, when the active vibration insulator 1 employs the adaptive control mode alone, it is constructed free of the mode switcher 12 and the map controller 14. In this instance, only the adaptive controller 15 outputs the cyclic inspection signal y to the driver 16.

Having now fully described the present invention, it will be apparent to one of ordinary skill in the art that many changes and modifications can be made thereto without departing from the spirit or scope of the present invention as set forth herein including the appended claims.

What is claimed is:
1. An active vibration insulator, comprising:
an electromagnetic actuator for generating vibrating forces depending on supplied electric current;
a control-signal generator for generating cyclic control signals based on cyclic pulsating signals output from a vibration generating source of a vehicle, the cyclic control signals actively inhibiting vibrations generated by the vibration generating source from transmitting to a specific part of the vehicle;
a driver for driving the electromagnetic actuator by varying the supplied electric current based on the cyclic control signals;
a calculator for calculating an estimated transfer function composed of estimated values of a transfer function for a transfer system including the electromagnetic actuator and the driver; and
a judge controller for judging an inoperative malfunction of the electromagnetic actuator based on the estimated transfer function.

2. The active vibration insulator set forth in claim 1 further comprising a first-datum-value storage for storing a datum gain threshold value for gain components of the estimated transfer function in advance, wherein:
the judge controller judges that the electromagnetic actuator is under the inoperative malfunction when the gain components of the estimated transfer function are smaller than the datum gain threshold value.

3. The active vibration insulator set forth in claim 1 further comprising a second-datum-value storage for storing a datum phase range for phase components of the estimated transfer function in advance, wherein:
the judge controller judges that the electromagnetic actuator is under the inoperative malfunction when the phase components of the estimated transfer function fall outside the datum phase range.

4. The active vibration insulator set forth in claim 1, wherein:
the control-signal generator generates cyclic inspection signals composed of cyclic signals whose frequency is from 0 to 30 Hz, and outputs the cyclic inspection signals to the driver; and
the active vibration insulator further comprising a detector for detecting driving waveforms of the electromagnetic actuator driven by the driver based on the cyclic inspection signals, wherein:
the calculator calculates the estimated transfer function based on the cyclic inspection signals and the driving waveforms.

5. The active vibration insulator set forth in claim 4, wherein:
the cyclic inspection signals are composed of inspection signals whose amplitude is a predetermined amplitude or less.

6. The active vibration insulator set forth in claim 4, wherein:
the cyclic inspection signals last for inspection-signal times which fall within a predetermined period of time.

7. The active vibration insulator set forth in claim 2, wherein:
the first datum-value storage stores a plurality of the gain threshold values which differ depending on vehicle conditions; and
the judge controller judges that the electromagnetic actuator is under the inoperative malfunction when the gain components of the estimated transfer function are smaller than the datum gain threshold values, which correspond to the vehicle conditions when the calculator calculates the estimated transfer function.

8. The active vibration insulator set forth in claim 3, wherein:
the second-datum-value storage stores a plurality of the datum phase ranges
which differ depending on vehicle conditions; and
the judge controller judges that the electromagnetic actuator is under the inoperative malfunction when the phase components of the estimated transfer function fall outside the datum phase ranges, which correspond to the vehicle conditions when the calculator calculates the estimated transfer function.

9. The active vibration insulator set forth in claim 1, wherein:
the calculator calculates the estimated transfer function after an ignition switch of the vehicle is turned on.

10. The active vibration insulator set forth in claim 9, wherein:
the calculator calculates the estimated transfer function when an ignition switch of the vehicle is turned on.

11. The active vibration insulator set forth in claim 9, wherein:
the calculator calculates the estimated transfer function when the vehicle is under idling.

12. The active vibration insulator set forth in claim 9, wherein:
to calculator calculates the estimated transfer function after a predetermined time has passed since an ignition switch of the vehicle is turned on and when the vehicle is under idling.

* * * * *